United States Patent
Gastineau

[11] Patent Number: 6,149,450
[45] Date of Patent: *Nov. 21, 2000

[54] SMART CARD ADAPTER LATCH

[75] Inventor: Douglas Reid Gastineau, Newport Beach, Calif.

[73] Assignee: ITT Manufacturing Enterprises, Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 09/007,327

[22] Filed: Jan. 13, 1998

Related U.S. Application Data

[60] Provisional application No. 60/047,340, May 21, 1997.

[51] Int. Cl.$^7$ .................................................. H01R 13/62
[52] U.S. Cl. ........................................... 439/325; 439/352
[58] Field of Search .................................... 439/638, 325, 439/327, 328, 350, 357, 786, 816, 818, 820, 834, 836, 837, 858, 861, 846, 819, 788, 319, 946, 76.1, 352, 159, 160, 152, 260

[56] References Cited

U.S. PATENT DOCUMENTS

| | | |
|---|---|---|
| 5,316,495 | 5/1994 | Frantz .................................... 439/372 |
| 5,375,037 | 12/1994 | Le Roux ................................. 361/684 |
| 5,402,095 | 3/1995 | Janniere .................................. 235/441 |
| 5,518,415 | 5/1996 | Kantner et al. ......................... 439/352 |
| 5,538,437 | 7/1996 | Bates, III et al. ...................... 439/352 |
| 5,674,080 | 10/1997 | Takemura ............................... 439/159 |
| 5,679,007 | 10/1997 | Potdevin et al. ....................... 439/76.1 |
| 5,683,264 | 11/1997 | Hobgood et al. ...................... 439/352 |
| 5,752,857 | 5/1998 | Knights ................................... 439/638 |
| 5,820,414 | 10/1998 | Omori ..................................... 439/638 |
| 5,850,103 | 12/1998 | Takemura ............................... 257/679 |

*Primary Examiner*—Paula Bradley
*Assistant Examiner*—Ross Gushi
*Attorney, Agent, or Firm*—Thomas L. Peterson

[57] ABSTRACT

An adapter is described for receiving a smart card (16) and for electrically connecting smart card pads (24) to terminals (44) at the rear of a PC card (40), which includes a simple and reliable latch (72) for locking the adaptor to the PC card. The latch is slidably mounted on the connector, and has a rear part (74) positioned to be pushed forward by the leading edge (80) of a smart card, and a front part (62) in the form of a pin that causes a pair of arms (54, 56) of the adaptor to lock to the PC card. The rear part is in the form of a flat bar that lies in the plane of the smart card-receiving slot (14), the flat bar extending across the width of the adaptor and having handles (100, 102) at its opposite sides that project from opposite sides of the adaptor housing for manual movement of the latch.

13 Claims, 3 Drawing Sheets

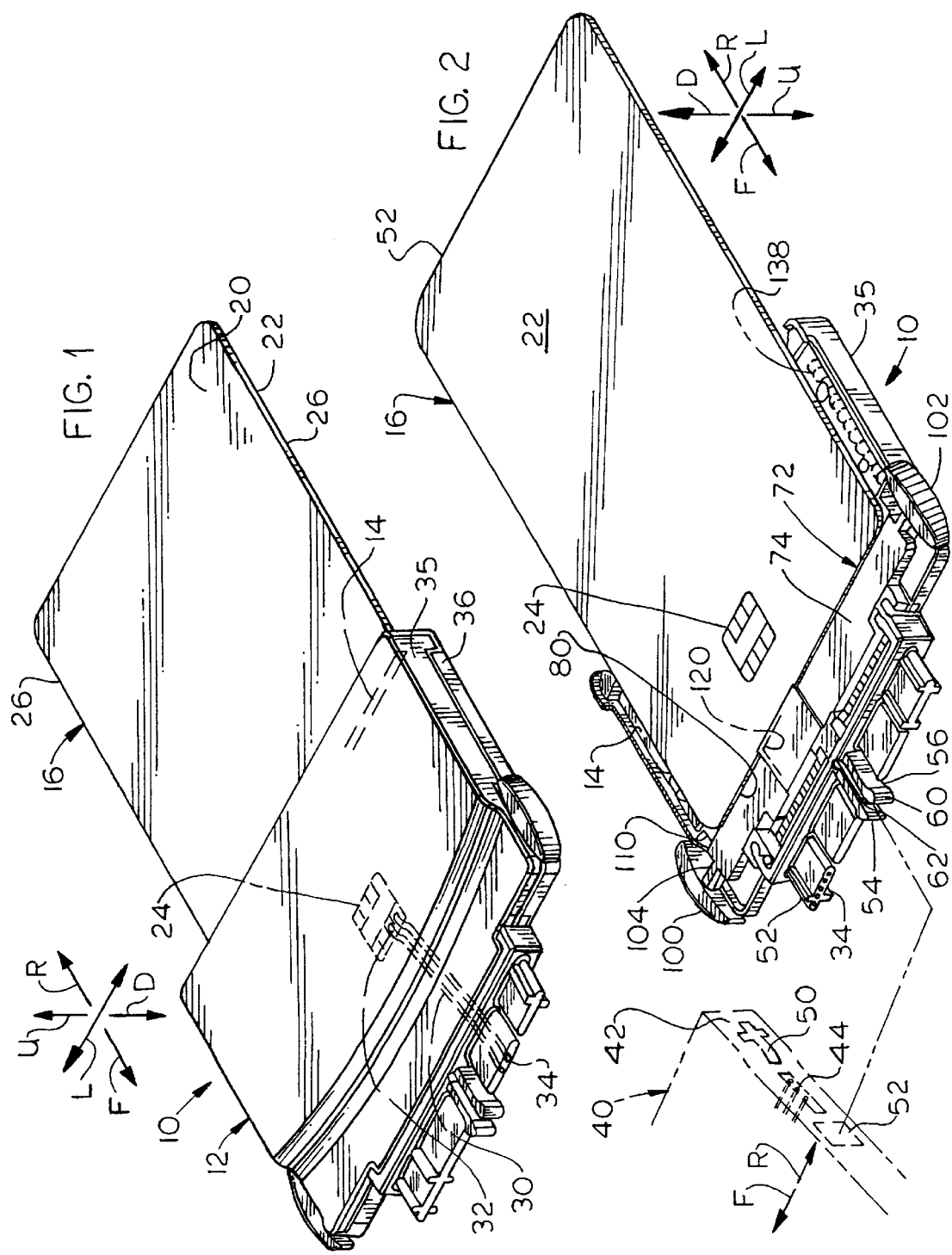

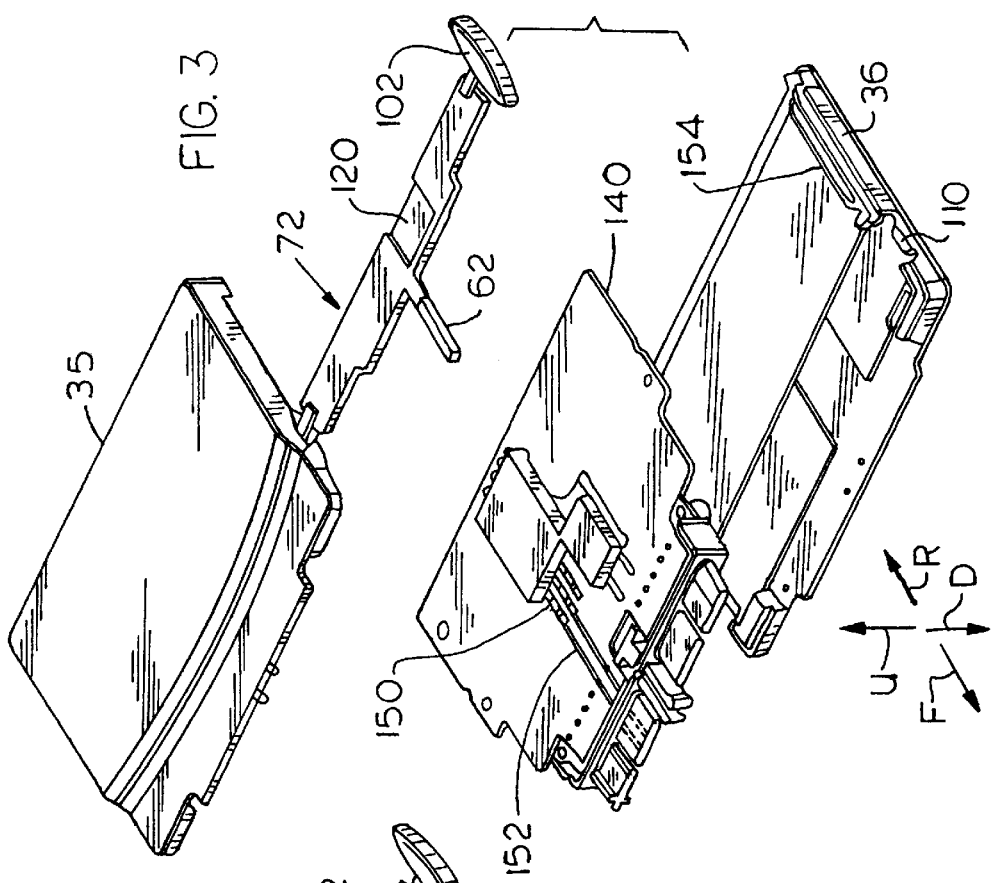
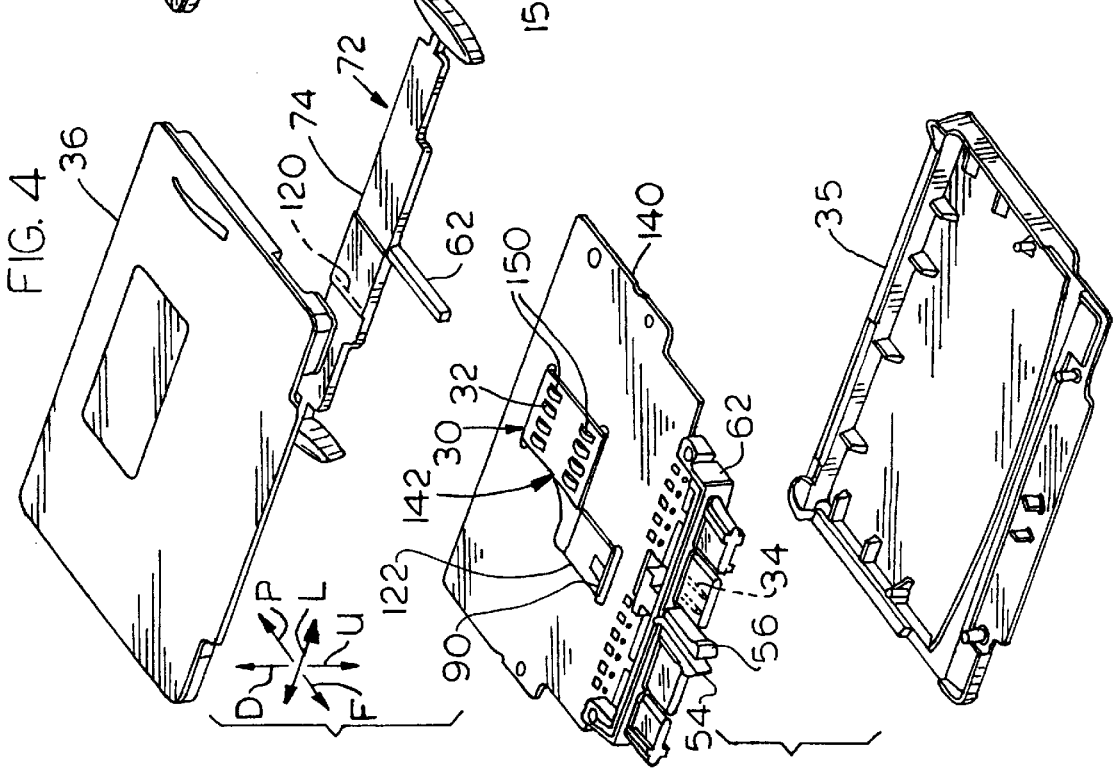

SMART CARD ADAPTER LATCH

CROSS REFERENCE

This patent application claims the benefit of provisional application Ser. No. 60/047,340 filed May 21, 1997.

BACKGROUND OF THE INVENTION

PC cards, which generally have printed circuits, are available in three types defined by PCMCIA (Personal Computer Member Card International Association) standards. All three cards have a width and length of 54 mm×85.6 mm, with maximum thicknesses of 3.3 mm, 5 mm, and 10.5 mm, with the type 11 cards (thickness of 5 mm) being the most common type. Standard PC cards have front connectors with 68 pin contacts. More recent standard PC cards have become available with rear connectors for connecting to a variety of devices. U.S. Pat. No. 5,411,402 describes a PC card rear connector of a type that is commonly used, which has a row of pin contacts and which has an undercut slot at the middle to enable a device to be locked to the rear connector when mated thereto. That patent describes a connector device at the end of a cable for mating and latching to the rear connector of the PC card.

There has arisen the need for an adaptor for connection to the rear of a PC card, where the adaptor can receive a smart card and connect the pads on a face of the smart card to the terminals at the rear of the PC card. A smart card is a card constructed in accordance with International standards. It contains a memory accessible from contact pads on a surface of the card, and the card generally has a thickness of no more than about 1 mm. It would be desirable if the adaptor was reliably held to the PC card when the adaptor held a PC card, to avoid interruption in the passage of signals between the two cards. It also would be desirable if the adaptor extended a minimum distance behind the PC card.

SUMMARY OF THE INVENTION

In accordance with one embodiment of the present invention, a smart card adaptor, which is of simple construction, is provided which automatically latches to a PC card rear connector when a smart card is fully inserted in the adaptor. The adaptor includes a latch that is moveable between locked and released positions, with a front part of the latch projecting far forward in the locked position, and with a latch rear part lying in the path of the smart card to be moved forward by the leading edge of the smart card as the smart card becomes fully inserted, to move the front part so as to lock the adaptor to the PC card rear connector.

The latch can be formed by an integral member that includes a plate-like latch bar that extends across the width of the adaptor, and a pin projecting forwardly from the latch bar. Handles at opposite sides of the latch bar lie outside opposite sides of the adaptor, and enable a person to grasp the latch bar to move it rearwardly to unlatch the adaptor from the PC card while also pushing the smart card rearwardly.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of an adaptor of the present invention, showing a smart card fully installed therein, and with the adaptor in a right-side-up orientation.

FIG. 2 is an isometric exploded view showing the adaptor and smart card of FIG. 1, and also showing, in phantom lines, a portion of a PC card, with the adaptor shown upside-down from its orientation of FIG. 1, and with the bottom cover part removed.

FIG. 3 is an exploded view of the adaptor of FIG. 1, shown in an upside-down orientation.

FIG. 4 is a view similar to that of FIG. 3, but with the parts in a right-side-up orientation.

DESCRIPTION OF THE PREFERRED EMBODIMENT

Figure 5:
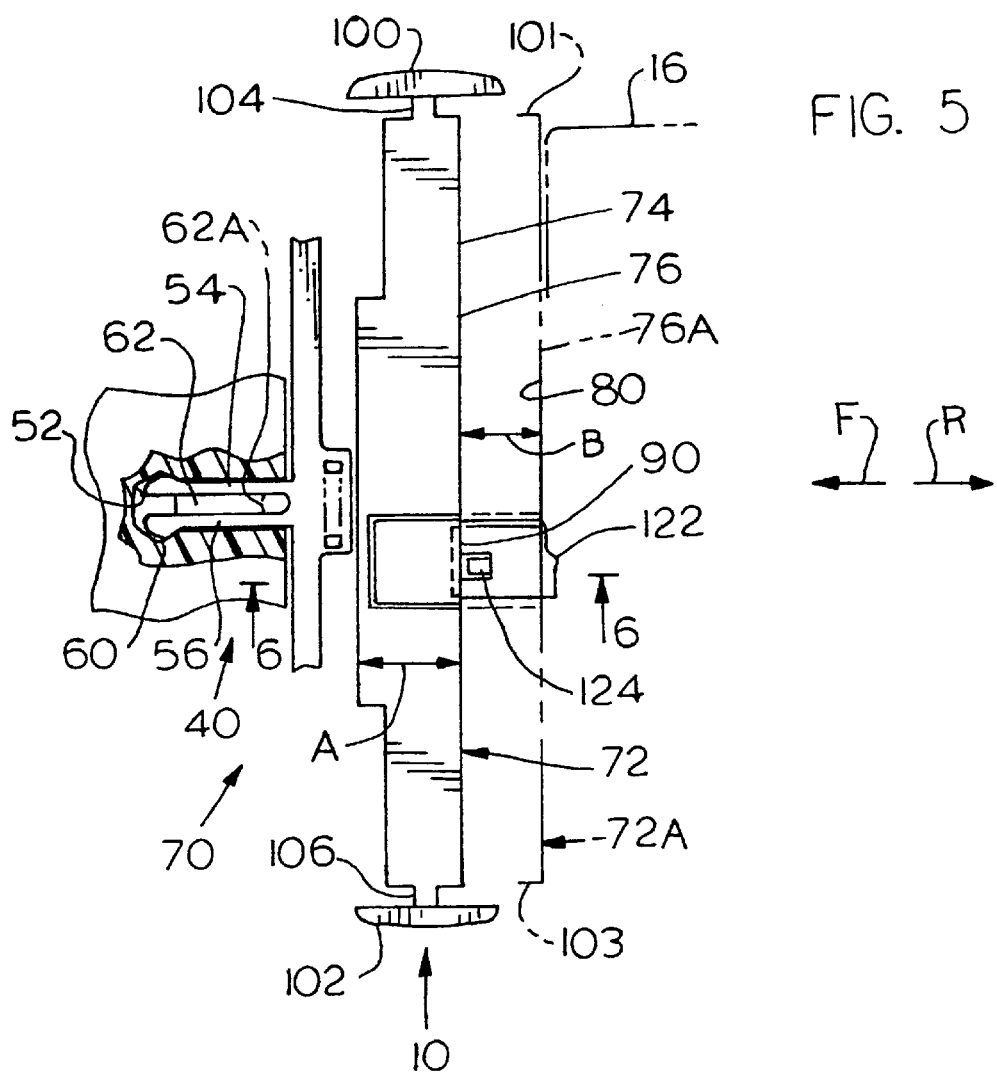
FIG. 5 is a plan view of the latch of FIG. 4 in a right-side-up orientation and showing the card-sensing switch and a portion of the PC card.

FIG. 1 illustrates an adaptor 10 of the present invention, which includes a housing 12 with a slot 14 that opens in a rearward direction R, to receive a smart card 16 (it could open laterally or upward). The smart card has upper and lower faces 20, 22 spaced along up and down directions U,D, and has pads 24 on its lower face which are usually connected to a memory chip embedded in the card. A standard smart card has a width in the lateral direction L between its side edges 26 of 54 mm which equals the width of a standard PC card. The smart card has a thickness of about 1 mm and is a thin card, as compared to the PC card which has a thickness of a plurality of mm. The adaptor has contact arrangements or contact means 30 with rear parts 32 that engage the pads 24 to make electrical contact therewith, and with front parts 34 in the form of socket contacts that are accessible from the front of the adaptor. Only a few of the many socket contacts 34 are shown. The housing 12 that surrounds the contact means includes upper and lower cover halves 35, 36 which are held to each other.

FIG. 2 shows the adaptor 10 in an upside-down orientation, and with the bottom cover half removed so only the top cover half 35 is shown. FIG. 2 also shows, in phantom lines, a PC card 40 with a PC card rear connector 42 that the adaptor 10 is designed to mate with. The rear connector 42 has an interrupted row of terminals 44 in the form of pins, which are designed to mate with the adaptor socket contacts. In particular, the PC card rear connector 42 has several openings 50 that receive corresponding forward projections 52 on the adaptor, which surround the socket contacts.

It is highly desirable to provide a means for latching or locking the adaptor 10 to the PC card rear connector 42, when the socket contacts 34 are mated to the terminals 44, to prevent the adaptor from pulling out partially and interrupting the connections. To this end, the rear connector 42 is provided with a strike 52 in the form of an undercut slot. The adaptor has a pair of latch arms 54, 56 which can fit into the slot 52 by bending the arms closer together, until lugs 60 at the front ends of the arms lie in the undercut slot. Then, a locking pin 62 is moved forward, to prevent the lugs 62 from moving together. FIG. 5 shows this situation, except for the illustrated position of the pin 62, the front ends of the arms 54, 56 and their lugs 60 could move closer together to permit the arms to be moved rearwardly out of the slot or strike 52. When the pin 62 is moved rearwardly until its front end is at 62A, the front ends of the arms and the lugs can move together and the adaptor can be pulled out, or unmated, from the PC card 40.

In accordance with one aspect of the present invention, applicant provides a latch mechanism 70 that assures that the adaptor is locked to the PC card whenever the adaptor is plugged into the PC card and a smart card has been fully inserted into the adaptor. The mechanism is designed to avoid a situation where the smart card has been fully inserted into the adaptor, but a person has forgotten to latch or lock the adaptor to the PC card. The mechanism 70 includes a latch 72 that includes a front part in the form of the pin 62 that controls locking of the arms 54, 56 (which are part of the latching mechanism) and a rear part 74. The rear part 74 has a rear edge or edge 76 lying in the plane of the smart card 16, by locating it in the plane of the slot that receives the smart card 16. The rear end 76 of the latch is designed to be pushed forward by the forward or leading edge 80 of the smart card 16.

Initially, it may be assumed that the latch 72 is in its rearward position 72A. When the smart card 16 is inserted into the slot, it is moved forwardly until its leading edge 80 first encounters the rear edge at 76A of the latch. Further forward movement of the smart card causes it to push the latch bar forwardly F, and therefore also push the pin 62 forwardly. The smart card is pushed forward until it engages a stop 90 on a switch and cannot be pushed any further forward. The pin 62 is then positioned to prevent unlocking of the latch mechanism.

FIG. 4 illustrates the latch 72, showing the front part or pin 62 and the rear part or 74. The rear part 74 is in the form of a plate that extends in the lateral direction L across the entire width of the adaptor. The thickness of the plate of the latch rear part 74 is about the same as the thickness of the smart card-receiving slot. The length of the rear part 74 in the front and rear directions F, R is relatively small. As shown in FIG. 5 the length A of the plate-like rear part 74 is only slightly greater than the distance B that it moves between its rear edge release position at 76A and its rear edge lock position 76, during forward insertion of the smart card 16. The latch bar has handles 100, 102 at its laterally opposite sides, which lie beyond opposite sides 101, 103 of the adaptor housing. Narrowed slider parts 104, 106 of the latch project through slots in the housing, and the latch is preferably slidably mounted on the housing at the parts 104, 106.

FIGS. 2 and 3 show the slots 110 at the opposite sides of the housing, through which the slider parts 104, 106 extend. Each of the handles such as 100 is elongated in the forward and rearward directions, so that it covers the slot 110 in both the locked and released positions of the latch and its latch bar.

Figure 6:
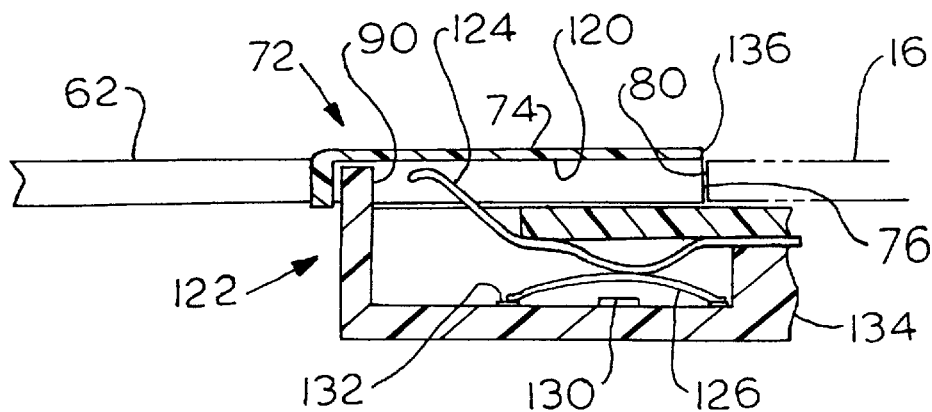
FIG. 6 is a view taken on line 6—6 of FIG. 5.

The latch rear part 74 has a recess 120, which is designed to receive a switch actuator. As shown in FIG. 5, the adaptor has a switch 122 with an actuator 124 that detects full insertion of a smart card. As shown in FIG. 6, the particular switch has an actuator 124 that is depressed by the smart card 16, which causes depression of a snap dome 126 to connect a pair of contacts 130, 132. The switch is operated when the leading edge 80 of the card is on the order of magnitude of 1 mm from a stop 90 formed by the switch housing 134. The switch housing 134 is fixed through the circuit board to the adaptor housing 12, so the switch housing can be considered part of the adaptor housing. The depression 120 in the latch rear part 74 is designed to receive the switch actuator 124 to avoid interference with it. It would be possible to just cut a hole at the depression 120, but applicant prefers to leave a top wall 136 thereat to strengthen the latch bar. Forward movement of the card leading edge 80 moves the latch rear part 74 forwardly, until the rear edge 76 of the latch rear part lies even with the stop 90. The latch can move slightly forward thereof, but is not pushed any further forward.

The latch rear part 74 must be in its rearward or release position 74A (FIG. 5) in order to mate the adaptor to the PC card. If a person attempts to mate the adaptor with the PC card with the latch in its forward, locked position, he will find that the lugs 60 will not enter the undercut slot or strike 52 in the PC card, so he will grasp the handles 100,102 to move the latch rearward. Even if the person thereafter forgets to move the latch forward, the mere insertion of the smart card to its fully inserted position will automatically move the latch forward and lock the adaptor to the PC card. FIG. 2 indicates, in phantom lines, a spring 138 which could be used to automatically push the latch 72 forward, so the handles have to be pushed rearwardly R to insert the adaptor and thereafter the adaptor remains locked to the PC card.

When a smart card is to be removed, this can be done by moving the handles 100, 102 rearwardly. This indicates, to a person not familiar with the device, that the smart card is ready to be pulled out.

FIG. 4 shows additional details of the adaptor. The adaptor includes a circuit board 140 with a hole therein, and with a connector and detector combination 142 lying in the hole, the detector part being formed by the switch 122 with its stop 90. The switch has a plurality of contact elements 150 which project into the slot to engage the smart card pads, with the contact elements 150 forming first or rear contact ends 32 of the contact means 30. As shown in FIG. 3, the connector contact elements 150 have contact tails that are soldered to traces 152 of the circuit board that form part of the contact means, with the front or second contact ends 34 having tails soldered to the traces 152 of the contact means. The adaptor can be assembled by laying the latch 72 in place, by projecting its pin 62 between the arms 54, 56 and with its handles lying in slots 110 near the opposite sides of the lower housing half. Then, the circuit board 140 is laid on the lower cover half, on walls 154. Then the upper housing half 34 is laid over the latch, circuit board, and lower housing half and fixed thereto, as by welding, a snap fit, adhesive, etc.

Although terms such as "up", "down", etc. have been used to describe the invention, it should be understood that the adaptor can be used in any orientation with respect to the Earth.

Thus, the invention provides a smart card adaptor for mating to a PC card rear connector, and especially a latch mechanism for latching to the PC card. The latch mechanism includes a latch that is moved by the leading edge of a smart card, from a released position to a locked position, to assure that the adaptor is locked in place whenever a smart card is to be read into or out of. The latch is preferably a one-piece (all parts molded together or separate parts fixed together) member which slides forward and rearward in the adaptor, and has a plate-like rear part, that lies primarily in the plane of the smart card. Handles at laterally opposite sides of the latch rear part lie outside the adaptor housing, for grasping by the fingers of a person's hand to move the latch. The latch rear part has a recess which receives an electrical switch that detects full insertion of the smart card and that forms a stop that precisely limits the smart card in its insertion.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An adaptor for receiving thin a card that has a card leading edge, and for connecting to a PC card rear connector and locking to a strike of the PC card, comprising:

a latch having a latch rear part positioned to be moved at least partially forward by said card leading edge, said latch having a latch front part moveable by said rear part to lock said latch to said PC card strike.

2. The adaptor described in claim 1 wherein:

said latch has an external handle which is fixed to said latch rear part and which is manually moveable in a rear direction to push said thin card rearwardly and unlock said latch from said strike.

3. The adaptor described in claim 1 wherein:

said adaptor has a housing with laterally spaced opposite sides, and said latch rear part is in the form of a flat bar that is slidable in forward and rearward directions, with said flat bar extending laterally between said housing opposite sides and having handles that lie outside said housing at said housing laterally opposite sides.

4. The adaptor described in claim 3 including said card wherein said card has opposite faces and a plurality of contact pads on a first of said faces, and including said PC card, wherein:

said adaptor housing has a stop, said smart card leading edge abuts said stop, said adaptor has a plurality of contacts that engage said contact pads, said flat bar lies in said lock position, and said latch is lock to said strike of said PC card.

5. A smart card adaptor for connecting pads on a face of a planar smart card that has a leading edge, to terminals of a PC card rear connector that lies at the rear of the PC card, and for mating with the PC card, where the PC card rear connector has a strike, where the adapter has a housing with guide walls forming a slot for receiving the smart card, and where the adaptor has a plurality of contact means with first contact ends for engaging the smart card pads and second contact ends coupled to said first contact ends for engaging the PC card rear connector terminals, wherein said adaptor includes:

a latch mechanism which includes a latch that is moveable between a locked position wherein it locks said adaptor to said strike when said adaptor and PC card rear connector are mated, and a release position wherein it releases said adaptor from said locked position;

said latch mechanism includes a latch with a front part that is movably mounted on said housing between a locked position wherein it maintains said latch in said locked position and a release position, and a rear part that is positioned in the path of said smart card leading edge to be moved by said leading edge, with said rear part being coupled to said front part to hold said front part in said locked position when said rear part has been moved to said locked position by said leading edge.

6. The adaptor described in claim 5 wherein:

said front and rear parts of said latch are fixed to each other and are confined to sliding in forward and rearward directions, with said second part having a rear end lying in the path of the smart card leading edge as it moves to a fully installed position.

7. The adaptor described in claim 5 wherein:

said latch mechanism includes a pair of arms with front portions forming lugs that project away from each other to lock to said strike when said arm front portions are prevented from moving closer together;

said latch front part comprises a pin that lies between said arms and that can move to forward and rearward positions to respectively prevent and allow said arm front portions to move together;

said adaptor includes a stop that is fixed to said housing and that is positioned to directly abut said card leading edge when said card is fully installed;

said latch front and rear parts are formed by an integral member that includes a rear edge lying in the plane of said slot and positioned a plurality of millimeters rearward of said stop.

8. The adaptor described in claim 7 wherein:

said card has laterally opposite edges and said housing has laterally opposite sides;

said latch has laterally opposite sides that project from said housing sides and that form handles.

9. A smart card adaptor for receiving a smart card that has pads and a leading edge, wherein the adaptor includes an adaptor housing with a front portion and with a pair of forwardly-projecting arms that have front ends with lugs thereon with said arms being deflectable toward and away from each other and forming a pin-receiving space between them, said adaptor including a latch that includes a pin that can move forward and rearward between said arms between lock and release positions, wherein:

said housing includes a rearwardly-opening smart card slot that can receive the smart card when it is inserted forwardly to a full insertion position, said adaptor including a plurality of contacts for engaging the pads when the card is in said full insertion position;

said latch has a rear end lying in line with said slot and lying a plurality of millimeters rearward of the card leading edge of the fully inserted card in said release position of said pin and lying even with said card leading edge of the fully inserted card in said lock position of said pin.

10. The adaptor described in claim 9 wherein:

said housing has a height and a width, that are both perpendicular to predetermined forward and rearward directions;

said latch is in the form of an integral member with said rear end being in the form of a plate that extends across the width of said housing and that has opposite sides that are slidably mounted on said housing, and with a front end forming said pin.

11. The adaptor described in claim 9 wherein:

said housing has a height and width, that each extend perpendicular to front and rear directions and said housing has slots at each of said sides;

said latch rear end is flat and elongated along the width of said housing and has opposite sides that project through said housing sides and that form handles lying at the outside of said housing sides.

12. The adaptor described in claim 11 wherein:

said latch has a handle and is free to move said pin between said lock and release positions; and including a spring coupled to said latch and said housing, and urging said latch forwardly to said lock position of said pin.

13. A smart card adaptor for connecting pads on a face of a planar smart card that has a leading edge, to terminals of a PC card rear connector that lies at the rear of the PC card, and for mating with the PC card, where the PC card rear connector has a strike, where the adapter has a housing with guide walls forming a slot for receiving the smart card, where the adaptor has a plurality of contact means with first contact ends for engaging the smart card pads and second contact ends coupled to said first contact ends for engaging the PC card rear connector terminals, and where the adaptor has a switch with a switch actuator lying rearward of the front end of a path of said smart card leading edge to be moved by the smart card leading edge as the smart card approaches a fully installed position wherein said adaptor includes:

a latch mechanism which includes a latch that is moveable between a locked position wherein it locks said adaptor to said strike when said adaptor and PC card rear connector are mated, and a release position wherein it releases said adaptor from said locked position;

said latch mechanism includes a latch with a front part that is movably mounted on said housing between a locked position wherein it maintains said latch in said locked position and a release position, and a rear part that is positioned in the path of said smart card leading edge to be moved by said leading edge, with said rear part being coupled to said front part to hold said front part in said locked position when said rear part has been moved to said locked position by said leading edge;

said housing has a width and has opposite sides;

said rear part of said latch is slideably mounted on said housing and has a plate-like portion lying in the path of said card leading edge and extending across the width of said housing, and forming handles at said housing opposite sides;

said plate-like portion has a recess and said switch actuator lies in said recess.

* * * * *